United States Patent
Varshney et al.

(10) Patent No.: US 12,481,710 B2
(45) Date of Patent: Nov. 25, 2025

(54) RECOMMENDATION SYSTEM USING RETRIEVAL-AUGMENTED GENERATION

(71) Applicant: NVIDIA CORPORATION, Santa Clara, CA (US)

(72) Inventors: Tanay Varshney, San Jose, CA (US); Kari Ann Briski, San Jose, CA (US); George Joseph Conway, Sunnyvale, CA (US); Davide Marco Onofrio, San Francisco, CA (US); Annie Prasanna Surla, San Jose, CA (US); Shashank Verma, Milpitas, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 143 days.

(21) Appl. No.: 18/408,394

(22) Filed: Jan. 9, 2024

(65) Prior Publication Data
US 2025/0225190 A1 Jul. 10, 2025

(51) Int. Cl.
G06F 16/9535 (2019.01)
G06F 16/334 (2025.01)
G06F 16/9532 (2019.01)

(52) U.S. Cl.
CPC ...... G06F 16/9535 (2019.01); G06F 16/3347 (2019.01); G06F 16/9532 (2019.01)

(58) Field of Classification Search
None
See application file for complete search history.

(56) References Cited

U.S. PATENT DOCUMENTS

| | | | |
|---|---|---|---|
| 2015/0081654 A1* | 3/2015 | Spangler | G06F 16/3325 707/723 |
| 2021/0042374 A1* | 2/2021 | Davis | G06F 16/24578 |
| 2021/0157835 A1* | 5/2021 | Vartakavi | G06F 16/2237 |
| 2021/0264296 A1* | 8/2021 | Martelaro | G06N 5/04 |
| 2022/0067087 A1* | 3/2022 | Reardon | G06F 16/638 |
| 2023/0162260 A1* | 5/2023 | Gubbi Lakshminarasimha | G06V 10/82 705/26.7 |
| 2023/0381663 A1* | 11/2023 | Payzer | A63F 13/67 |

OTHER PUBLICATIONS

He et al., "Large Language Models as Zero-Shot Conversational Recommenders", arXiv:2308.10053v1 [cs.IR] Aug. 19, 2023, 11 pages.

* cited by examiner

*Primary Examiner* — Richard L Bowen
(74) *Attorney, Agent, or Firm* — Squire Patton Boggs LLP; Sarah Mirza

(57) ABSTRACT

In various examples, a technique for recommending items is disclosed that includes receiving a request to recommend an item. The technique further includes generating, based on the request, one or more query tags, the one or more query tags including one or more preferred tags, at least one of the preferred tags specifying an item of interest. The technique also includes generating one or more subqueries based on the one or more query tags. The technique still further includes generating, based on the one or more subqueries, a query vector in an embedding space of the vector database. The technique further includes identifying, in the vector database and using the query vector, a plurality of candidate items. The technique still further includes selecting a recommended item from the plurality of candidate items based on the request.

20 Claims, 7 Drawing Sheets

Tag Extraction Prompt 228

402 —

INSTRUCTIONS:

You are to extract information from the following USER MESSAGE. If there isn't enough information to fill slots, fill with 'Nil'. Default values of ratings: 3.0 and 5.0. Default values of year: 2000 and 2020. Strictly follow ANSWER FORMAT

404 —

USER MESSAGE:

My children like Monster Express and movies made by Studio Sakura. Can you recommend a movie for them to watch that is appropriate for a 4 year old and made since 2020? I want movies rated 4 or above. I like movies with Ryan Smith but I don't like action movies

406 —

ANSWER FORMAT:

{"Preferred Genre": ["<Fill>"], "Preferred Movies": ["<Fill>"],
"Un Preferred Genre": ["<Fill>"], "Un Preferred Movies": ["<Fill>"],
Rating:["<Fill>", "<Fill>"], "Year": ["<Fill>", "<Fill>"],
"Actor/Director\": ["<Fill>"]}

---

Extracted Tags 230

Preferred Tags 236

| Preferred Genre 410 | Preferred Movies 412 |
|---|---|
| Animation, Family | Monster Express, Studio Sakura |

Non-Preferred Tags 238

| Un Preferred Genre 414 | Un Preferred Movies 416 |
|---|---|
| Action | Nil |

Filter Tags 240

| Rating 418 | Year 420 | Actor/Director 422 |
|---|---|---|
| 4.0, 5.0 | 2020, 2023 | Ryan Smith |

FIGURE 4A

Recommendation Prompt 258

Item Attributes 450

Movie Name: The Building Movie
Genre Tags: Action|Adventure|Animation|Children|Comedy|Fantasy|animation|childhood|computer animation|creativity|fast paced|imagination|original|oscar (best animated feature)|stop motion|toys
Actors: Chris Gant|Bill Arnett|Will Antonio
Directors: Christopher Miller|Phil Lord
Ratings: 3.7
Year Released: 2014

Movie Name: Defender
Genre Tags: Action|Adventure|Animation|Children|animation|coming of age|computer animation|fairy tale|family|mother daughter relationship|oscar (best animated feature)|sun|sun studios|visually stunning
Actors: Billy Connolly
Directors: Brenda Chapman|Mark Andrews|Steve Purcell
Ratings: 3.5
Year Released: 2012

Movie Name: The Building Electra Movie
Genre Tags: Action|Animation|Comedy|animation|electra|comics|kids and family|super hero|super-hero|superhero|superheroes|vigilante|visually appealing
Actors: Michael Cera|Ralph Fiennes|Will Arnett
Directors: Chris McKay
Ratings: 3.6
Year Released: 2017

Movie Name: Electra vs. Dynamo
Genre Tags: Action|Adventure|Animation|based on a comic|based on comic|electra|comics|dc comics|graphic novel|super hero|superhero|superheroes|vigilante
Actors: Kevin Conroy|Stuart Allan|Trevor Devall|Troy Baker
Directors: Jay Oliva
Ratings: 3.4
Year Released: 2015

Question 452

Recommend a movie which has an inspiring story like Electra Chronicles and has the cinematic style of a Sun Studios movie like Time Shift

FIGURE 4B

RECOMMENDATION SYSTEM USING RETRIEVAL-AUGMENTED GENERATION

BACKGROUND

Recommender systems generate suggestions for items that are related to specified preference information. The preference information can be associated with a user, and can include information such as other items the user likes and historical behavior of the user. The item categories can be, for example, movies, books, music, games, or other items for which a user is likely to be particularly interested in a subset of the items.

Existing recommender systems often use item selections made by a user in another system as preference information. The preference information can include a history of selections of items in a streaming video service, for example. Existing recommender systems identify items that are similar to the selected items and present the similar items as recommendations. Such existing recommendation systems do not provide an engaging experience, and do not provide recommendations that are particularly similar to personal preferences of the user, which are often more specific than can be determined from a list of previously selected items. Other existing recommender systems use a conversational chat-based interface to receive natural language input. The input is provided to an NLP model, but such models are complex and involve specific training to recognize and understand user preferences. Another approach uses large language models (LLMs) to generate recommendations, but such models can generate inaccurate results ("hallucinations") and are not necessarily updated as new items become available. Training an LLM is resource-intensive and time-consuming, so the data set on which the LLM is trained is likely to be out of date. Accordingly, such an LLM does not recommend items that have become available after the date at which the LLM was trained. As such, a need exists for more effective techniques for generating accurate and timely recommendations using a conversational natural language interface.

SUMMARY

In various examples, techniques for recommending items are disclosed that include receiving a request to recommend an item. The techniques further include generating, based on the request, one or more query tags, the one or more query tags including one or more preferred tags, and at least one of the preferred tags specifying an item of interest. The techniques also include generating one or more subqueries based on the one or more query tags, at least one of the subqueries being generated further based at least on one or more attributes of the item, the one or more attributes being retrieved from a vector database. The techniques still further include generating, based on the one or more subqueries, a query vector in an embedding space of the vector database. The techniques further include identifying, in the vector database and using the query vector, a plurality of candidate items. The techniques still further include selecting a recommended item from the plurality of candidate items based on the request and further based at least on the one or more attributes of the item.

One technical advantage of the disclosed techniques relative to existing approaches is the ability to generate accurate results that do not include incorrect results. If the LLM uses its default knowledge base to generate the recommendations, then some of the recommendations could be incorrect, since the generative model used by the LLM does not distinguish between correct and incorrect output. Since the LLM in the disclosed techniques is operationally restricted to using correct item information as its knowledge base for answering questions, the recommendations do not include recommendations based on incorrect item information that could be present in the more general knowledge base the LLM would ordinarily use.

Another technical advantage of the disclosed techniques is that the item information used to generate recommendations can be updated independently of the LLM. New item information can be added to the item information without re-training the LLM. Since re-training the LLM can take a substantial amount of time and computing resources, item information learned by the LLM becomes out-of-date and incomplete as new items become available. In contrast, the database of item information used by the disclosed techniques can be updated to include new or changed item information in a short amount of time. The disclosed techniques are thus able to generate recommendations using an LLM based on more recent item information than would otherwise be available to the LLM. These technical advantages represent one or more technological improvements over prior approaches.

BRIEF DESCRIPTION OF THE DRAWINGS

The present systems and methods for recommending items using retrieval-augmented generation with a language model are described in detail below with reference to the attached drawing figures, wherein:

FIG. 4A illustrates an example tag extraction prompt and example query tags, according to various embodiments;

FIG. 4B illustrates an example recommendation prompt, according to various embodiments;

DETAILED DESCRIPTION

Figure 1:
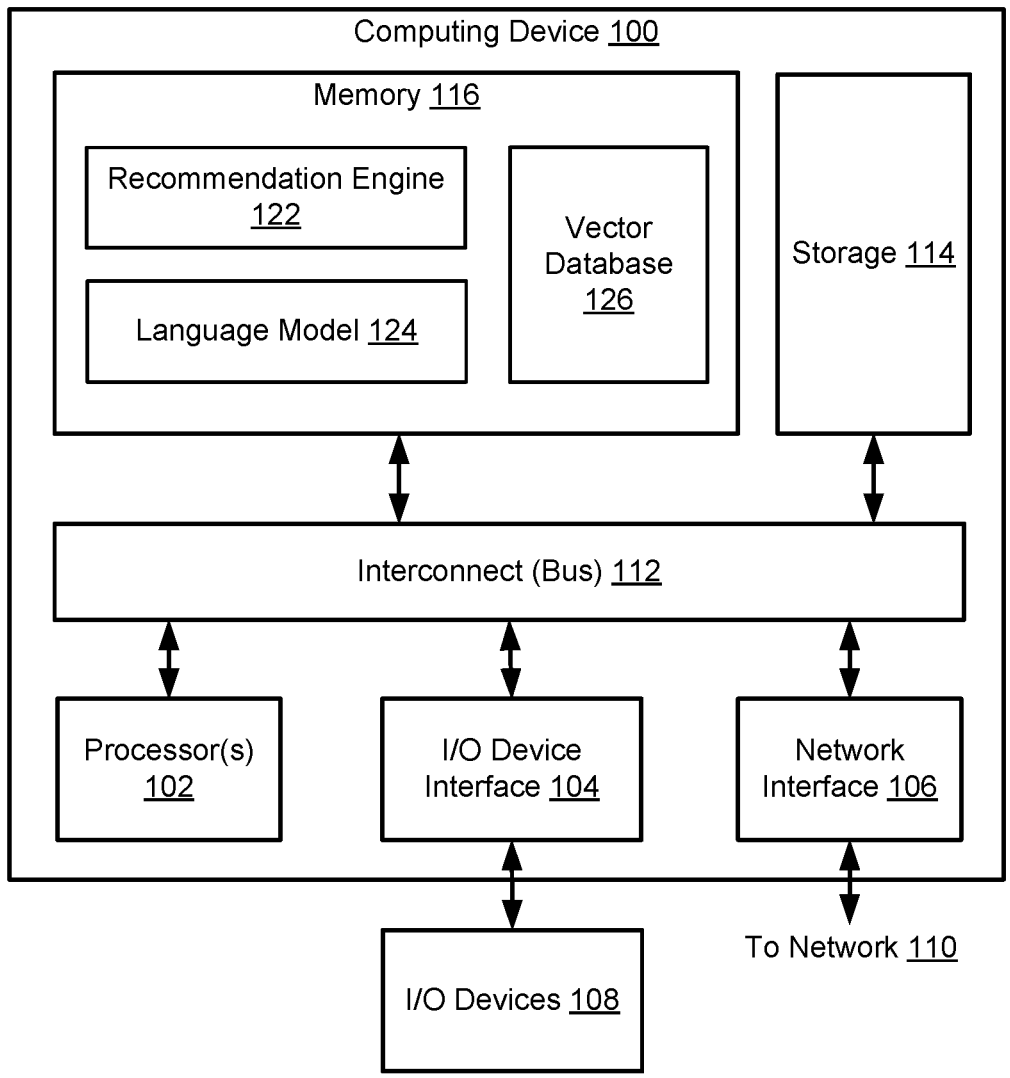
FIG. 1 illustrates a computing device configured to implement one or more aspects of various embodiments.

FIG. 1 illustrates a computing device 100 configured to implement one or more aspects of various embodiments. In at least one embodiment, computing device 100 includes a desktop computer, a laptop computer, a smart phone, a personal digital assistant (PDA), a tablet computer, a server, a talking kiosk, a smart device (e.g., smart speaker, smart display, digital assistant device, etc.), one or more virtual machines, an embedded system, an embedded hardware module that includes a system on a chip, a system on a chip, a computing system (e.g., an in-vehicle infotainment system) of an autonomous, semi-autonomous, or a non-autonomous machine, and/or any other type of computing device configured to receive input, process data, and optionally output sound and/or display images, and is suitable for practicing one or more embodiments. The computing device 100 includes a memory 116, one or more processors 102, an interconnect 112, storage 114, an Input/Output (I/O) device interface 104, and a network interface 106. The computing device 100 also includes and/or communicates with one or more I/O device(s) 108. The I/O device(s) 108 communicate with the interconnect 112 via the I/O device interface 104. The memory 116 can be a volatile random-access memory or other suitable type of memory.

In particular embodiments, a recommendation engine 122, language model 124, and vector database 126 are stored in the memory 116. The language model 124 can be a Large Language Model (LLM) or other suitable language model that generates text in response to prompts. The LLM 124 receives input from a user in the form of one or more recommendation requests posed by the user. Each recommendation request is a request to recommend an item (e.g., a physical item, a digital item, a title, a name, a location, a place, a company, a movement or action, a combination thereof, etc.), and can be in the form of a question, for example. The term "question" as used herein refers to a request to recommend an item based on one or more specified preference criteria. The question can be in a natural language compatible with the language model 124. The preference criteria can specify information related to items that are of interest to the user. The items of interest to the user, can be items the user prefers (e.g., likes), such as particular items and/or item genres the user prefers. The preference criteria can also specify information related to items that are not of interest to the user. The items not of interest to the user can include items the user does not prefer (e.g., dislikes), such as particular items and/or item genres the user does not prefer. The preference criteria can also include filter criteria that are to be satisfied by recommended items. Each of the filter criteria can specify a value or range of values for an attribute of an item, such as a movie rating, year of production, actor, or other attribute.

The recommendation engine 122 receives the recommendation request from the language model 124, uses the language model 124 to extract query tags from the recommendation request, retrieves information related to an item identified by the query tags from a vector database 126, and generates a query vector based on the query tags and the retrieved information. The vector database 126 can store vectors, which are also referred to as "embeddings." The vectors stored in the vector database 126 can be generated from data that is used to train the language model 124. Each vector is in an embedding space. Data in a text format, such as text strings, is converted to vectors in the embedding space using a suitable encoding operation such as a pooling operation that down-samples data, e.g., text strings, into a compressed form. Metadata can be stored in the vector database 126 in association with each stored vector. The metadata can be stored without being encoded. Database queries can be used to find and retrieve vectors from the vector database 126. A query can specify a vector, metadata, or both. The vector database 126 can identify stored vectors that are similar to the specified query vector according to a distance metric such as Euclidean distance, cosine similarity, or other suitable metric that measures distance between vectors. If metadata is specified in the query, then the vector database 126 identifies stored vectors that are similar to the specified query vector and have metadata that matches the specified query metadata.

The recommendation engine 122 uses the query vector to retrieve candidate item recommendations from the vector database 126. The recommendation engine 122 transmits the candidate item recommendations, including attributes of each candidate item recommendation, to the language model 124 along with the retrieved information related to the item that was identified in the question. The recommendation engine 122 also transmits a recommendation prompt to the language model 124. The recommendation prompt includes a question posed by the user. The recommendation prompt causes the language model 124 to select one of the candidate item recommendations that answers the question. The language model 124 presents the selected candidate item recommendation to the user. The user can further ask the language model 124 for an explanation of why the selected candidate item recommendation was chosen, and the language model 124 can provide reasons for the selection in terms of the items included in the candidate item recommendations.

It is noted that the computing device described herein is illustrative and that any other technically feasible configurations fall within the scope of the present disclosure. For example, multiple instances of recommendation engine 122, language model 124, or vector database 126 may execute on a set of nodes in a distributed and/or cloud computing system to implement the functionality of computing device 100.

In at least one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and/or a network interface 106. Processor(s) 102 may include any suitable processor implemented as a central processing unit (CPU), a graphics processing unit (GPU), an application-specific integrated circuit (ASIC), a field programmable gate array (FPGA), an artificial intelligence (AI) accelerator, a deep learning accelerator (DLA), a parallel processing unit (PPU), a data processing unit (DPU), a vector or vision processing unit (VPU), a programmable vision accelerator (PVA), any other type of processing unit, or a combination of different processing units, such as a CPU(s) configured to operate in conjunction with a GPU(s). In general, processor(s) 102 may include any technically feasible hardware unit capable of processing data and/or executing software applications. Further, in the context of this disclosure, the computing elements shown in computing device 100 may correspond to a physical computing system (e.g., a system in a data center or a machine) and/or may correspond to a virtual computing instance executing within a computing cloud.

In at least one embodiment, I/O devices 108 include devices capable of receiving input, such as a keyboard, a mouse, a touchpad, a VR/MR/AR headset, a gesture recognition system, a steering wheel, mechanical, digital, or touch sensitive buttons or input components, and/or a microphone, as well as devices capable of providing output, such as a display device, haptic device, and/or speaker. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

In at least one embodiment, network 110 is any technically feasible type of communications network that allows data to be exchanged between computing device 100 and internal, local, remote, or external entities or devices, such as a web server or another networked computing device. For example, network 110 may include a wide area network (WAN), a local area network (LAN), a wireless (e.g., WiFi) network, a cellular network, and/or the Internet, among others.

In at least one embodiment, storage 114 includes non-volatile storage for applications and data, and may include fixed or removable disk drives, flash memory devices, and CD-ROM, DVD-ROM, Blu-Ray, HD-DVD, or other magnetic, optical, or solid-state storage devices. Recommendation engine 122, language model 124, and/or vector database 126 may be stored in storage 114 and loaded into memory 116 when executed.

In one embodiment, memory 116 includes a random-access memory (RAM) module, a flash memory unit, and/or any other type of memory unit or combination thereof. Processor(s) 102, I/O device interface 104, and network interface 106 may be configured to read data from and write data to memory 116. Memory 116 may include various software programs or more generally software code that can be executed by processor(s) 102 and application data associated with said software programs, including recommendation engine 122 and/or language model 124.

Figure 2:
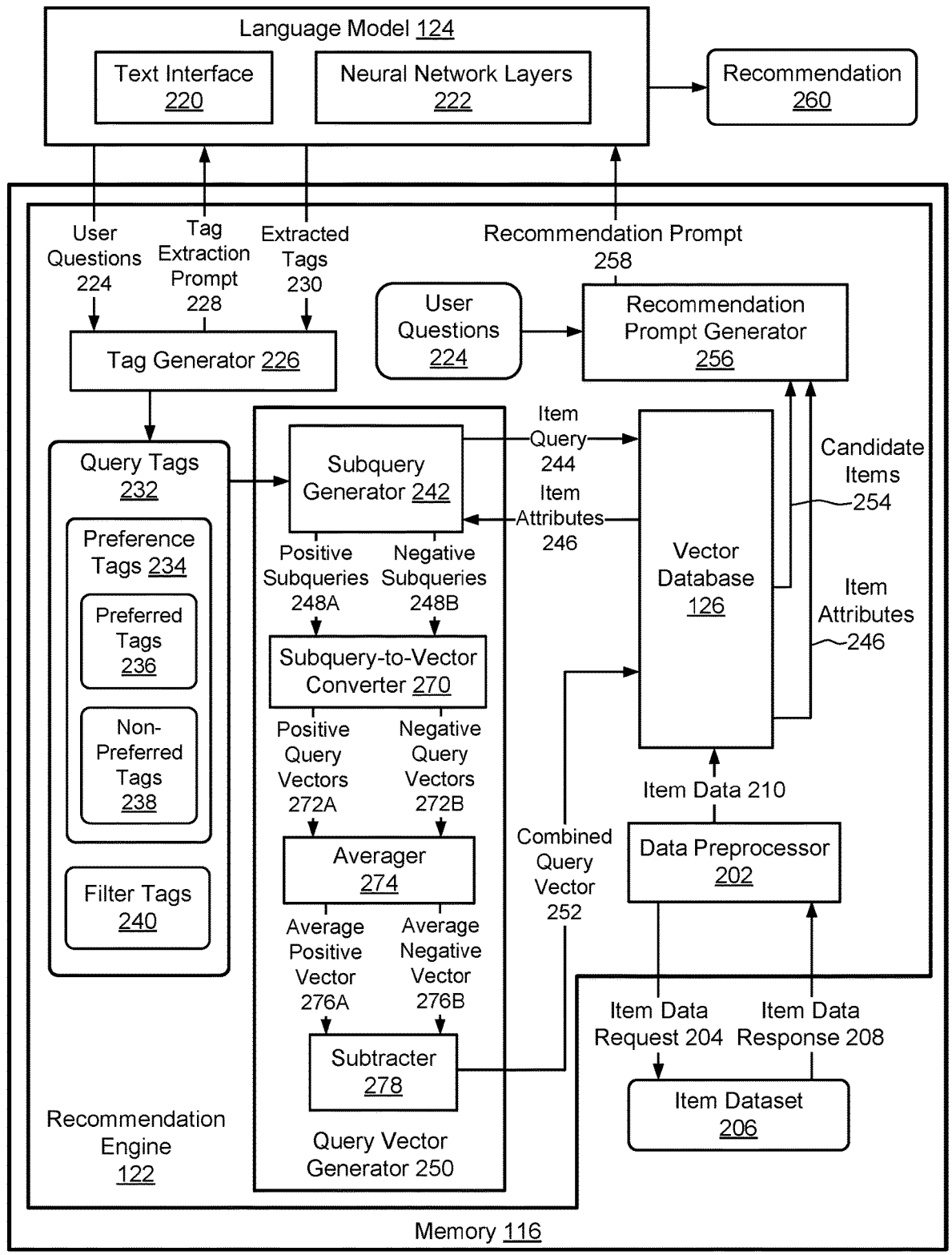
FIG. 2 is a more detailed illustration of the recommendation engine of FIG. 1, according to various embodiments.

FIG. 2 is a more detailed illustration of the recommendation engine 122 of FIG. 1, according to various embodiments. The recommendation engine 122 includes a data preprocessor 202, which retrieves item information from an item dataset 206. The item dataset 206 can be a database of item information, such as a movie information database from which information about particular movies can be retrieved. The data preprocessor 202 populates the vector database 126 with item information from the item dataset 206, and is invoked prior to using the recommendation engine 122 to generate item recommendations. As such, the data preprocessor 202 transmits an item data request 204 to the item dataset 206, and receives an item data response 208 specifying item information from the item dataset 206. The data preprocessor 202 converts the retrieved item information to item data 210 in a format suitable for storage in the vector database 126, and stores the converted retrieved item data 210 in the vector database 126. The retrieved item information can include a set of items, and a set of attributes for each item. For example, if the items are movies, the retrieved item information can include one or more movies, and, for each movie, one or more attributes, such as movie name, production year, rating, actor(s), and director. The data preprocessor 202 converts the retrieved item information to vectors in an embedding space used by the vector database 126 and stores the vectors in the vector database 126.

The recommendation engine 122 interacts with the language model 124 to generate a recommendation 260. The language model 124 includes a text interface 220 and neural network layers 222. As an example, the recommendation engine 122 can interact with the language model 124 via an Application Programming Interface (API) of the language model 124, which enables the recommendation engine 122 to receive one or more user questions 224 from the language model 124. The language model 124 can receive the user question 224 from a user, or alternatively, the recommendation engine 122 can receive the user questions from a user and provide the user question 224 to the language model 124 as input (not shown).

The recommendation engine 122 transmits prompts to the language model 124 to cause the language model 124 to perform actions, such as extracting information from the user question(s) 224 and generating the recommendation 260. A prompt can be, for example, text specifying instructions to for the language model 124. The recommendation engine 122 can transmit a recommendation prompt 258 that includes information about candidate recommendations to the language model 124 and instructs the language model 124 to select at least one of the candidate recommendations according to preference criteria specified in the recommendation prompt 258. The recommendation engine 122 retrieves candidate items 254 from a vector database 126 using a combined query vector 252, selects at least one candidate item 254 that the language model 124 can choose to recommend to the user, and generates a recommendation prompt 258 that includes at least a name of the selected candidate item 254. The recommendation prompt 258 can also include other information such as preference tags 234. The preference tags 234 can include preferred tags 236 (e.g., preferred genre, preferred movies, and so on) and/or non-preferred tags 238 for each selected candidate item 254. The language model 124 generates a recommendation that includes one or more of the selected candidate items 254 based on the question 224. The language model 124 uses the preference tags 234 to identify one or more candidate item(s) 254 that are of interest to the user. For example, the language model 124 can identify one or more candidate item(s) 254 having preferred tags 234, such as genre tags, that correspond to (e.g., match or are similar to) an item and/or item genre named in the question 224. The question 224 is received in a request to recommend an item. The language model 124 and/or the recommendation engine 122 can present the identified candidate item(s) 254 in a recommendation to the user, e.g., as a response to the user question(s) 224 in a chat-based user interface (UI), via another type of display or UI, and/or audibly.

In particular embodiments, upon receiving one or more user questions 224 from the language model 124, the recommendation engine 122 uses a tag generator 226 to generate one or more query tags 232. The tag generator 226 generates a tag extraction prompt 228 based on the user question 224 and transmits the tag extraction prompt 228 to the language model 124. The language model 124 extracts one or more extracted tags 230 from the user question 224 as specified by the tag extraction prompt 228 and transmits the extracted tags 230 to the tag generator 226. The tag generator 226 generates one or more query tags 232, which can be the same as the extracted tags 230, or can be a subset of the extracted tags 230 or a modified set of tags generated from the extracted tags 230.

The query tags 232 include one or more preference tags 234 and/or one or more filter tags 240. The preference tags 234 can be used to identify candidate items that are potentially of interest to the user, e.g., by requesting that the language model 124 identify items that are similar to items or item genres named by the preference tags 234. The preference tags 234 can include one or more preferred tags 236, which specify items and/or item genres the user prefers. Example preferred tags 236 include one or more item genres that are of interest to the user, or an item (e.g., a movie name) that is of interest to the user. The preference tags 234 can also include one or more non-preferred tags 238, which specify items and/or item genres that are not of interest to the user. Example non-preferred tags 238 include a non-preferred item genre (e.g., a movie genre disliked by the user) and a non-preferred item (e.g., a name of a movie disliked by the user). The filter tags 240 specify filter criteria that are to be used in addition to the combined query vector 252 when querying the vector database 126. Example filter tags 240 include an item rating (e.g., a movie rating on a scale of 1 to 5), an item year (e.g., a movie year of production), and a person or other entity associated with an item (e.g., a movie actor or director).

The recommendation engine 122 includes a query vector generator 250, which generates the combined query vector 252 based on the query tags 232. The query vector generator 250 includes a subquery generator 242, a subquery-to-vector converter 270, an averager 274, and a subtracter 278. The recommendation engine 122 provides the query tags 232 to the subquery generator 242, which generates subqueries 248 based on the query tags 232. The subqueries 248 include one or more positive subqueries 248A and/or one or more negative subqueries 248B. The query vector generator 250 uses the subqueries 248 to generate a combined query vector 252 in an embedding space that is used by the vector database 126. The recommendation engine 122 uses the query vector 252 to query the vector database 126 for candidate items 254 having characteristics matching the query vector 252. The positive subqueries 248A have query criteria specifying characteristics of items that are to be included in candidate items 254. The negative subqueries 248B have query criteria specifying characteristics of items that are to be excluded from candidate items 254. Each of the subqueries 248 can be the value of the respective query tag 232 in a text format or other suitable format, for example.

Since the user question 224 can refer to items for which information is not available in the knowledge base of the language model 124, the subquery generator 242 augments the knowledge base by retrieving attributes of one or more items identified in the user question 224 from the vector database 126. For example, if the user question 224 requests movies similar to a movie named "Monster Express," then the subquery generator 242 queries the vector database 126 for item attributes ("attributes") of the item that is named "Monster Express." The item identified in the user question 224 can include one or more of the preferred tags 236 that specify items, such as a "preferred movies" tag. To retrieve information related to the item from the vector database 126, the subquery generator 242 transmits an item query 244 specifying the name of the item (e.g., "Monster Express") to the vector database 126. The item query 244 can be in text format, vector format, or other suitable format. The vector database 126 transmits a response containing the item attributes 246 of the item identified by the specified name to the subquery generator 242. For example, for an item named "Monster Express," the attributes received from the vector database 126 include a "genre tags" attribute having the value "Action—Adventure|Comedy|Humor."

The subtracter 278 generates the combined query vector 252 based on an average positive query vector 276A and an average negative query vector 276B. The average positive query vector 276A is generated by the averager 274 as an average of one or more positive query vectors 272A. The positive query vectors 272A are generated by the subquery-to-vector converter 270 from the preferred tags 236 and/or from the item attributes 246. The average negative vector 276B is generated by the averager 274 as an average of the negative query vectors 272B. The negative query vectors 272B are generated by the subquery-to-vector converter 270 from the non-preferred tags 238.

The positive query vectors 272A are generated by the subquery-to-vector converter 270 based on the positive subqueries 248A. The positive subqueries 248A are formed from the preferred tags 236 and/or item attributes 246 that identify item genres of interest to the user (e.g., a "liked genres" attribute). Each of the positive subqueries 248A can be the value of a respective preferred tag 236 in the preference tags 234 (e.g., an item name or item genre specified by the user in the user question 224), or one or more item genres specified by an item attribute 246 received from the vector database 126. Example preferred tags 236 include names of one or more movie genres that are of interest to the user, or a name of a movie that is of interest to the user. The item attribute 246 that specifies an item genre can an item attribute 246 of an item specified in the user question 224 (e.g., an attribute retrieved from the vector database 126 that has the name "genre tags" and has a value specifying genres of a movie that is identified by the user in the user question 224).

The negative query vectors 272B are generated by the subquery-to-vector converter 270 based on the negative subqueries 248B. The negative subqueries 248B are formed from the non-preferred tags 238 by the subquery generator 242. Each of the negative subqueries 248B can be the value of the respective non-preferred tag 238 in a text format or other suitable format, for example. Example non-preferred tags 238 include a name of a movie genre that is not of interest to the user or a name of a movie that is not of interest to the user.

The subquery-to-vector converter 270 converts the subqueries 248 to respective query vectors 272 in an embedding space of the vector database 126. The subquery-to-vector converter 270 can convert each of the subqueries 248, including the positive subqueries 248A and/or the negative subqueries 248B, to a respective query vector 272 using a conversion operation compatible with the conversion to embedding space used by the vector database 126. For example, the vector database 126 can use an average pooling operation to map text into the embedding space for storage. The subquery-to-vector converter 270 can use the average pooling operation to convert each of the subqueries 248 to a respective query vector 272 so that the subqueries 248 can be used in a combined query vector 252 to query the vector database 126.

The query vector generator 250 uses the averager 274 to compute an average positive vector 276A as an average of the positive query vectors 272A, and also to compute an average negative vector 276B as an average of the negative query vectors 272B. The query vector generator 250 uses the subtracter 278 to compute the combined query vector 252 based on the average positive vector and the average negative vector. For example, the subtracter 278 can compute the query vector 252 as the difference between the average positive vector 276A and the average negative vector 276B. As another example, the combined query vector 252 can be calculated as the average positive vector 276A+(the average positive vector 276A−the average negative vector 276B). The query vector generator 250 also generates a filter query based on the filter tags 240. The filter query includes the filter conditions specified by the filter tags 240 in a query format appropriate for the vector database 126. The query vector generator 250 submits the combined query vector 252 and the filter query to the vector database 126, which identifies one or more candidate items 254 in the information stored in the vector database 126. The information stored in the vector database includes vector-format information based on the item data 210 received from the data preprocessor 202, for example.

The recommendation engine 122 provides the candidate items 254, the item attributes 246 (retrieved by the subquery generator 242), and the user question 224 to a recommendation prompt generator 256. The recommendation prompt generator 256 generates a recommendation prompt 258 that includes the candidate items 254, the item attributes 246, and the user question 224 in a prompt format suitable for use with the language model 124. The recommendation prompt 258 instructs the language model 124 to generate a recommendation based on the information provided in the recommendation prompt 258 without using other information about items that the language model 124 may have (e.g., from the training of the language model 124). In this way, the language model 124 generates the recommendation 260 using the item information from the vector database 126, which is correct and can be updated frequently, instead of information present in the language model 124. Thus, the recommendation 260 is accurate and based on recent item information. The language model 124 can then present the recommendation 260 to a user, e.g., via the text interface 220 in a chat-based format.

It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example computing device 600 of FIG. 6, and/or example data center 700 of FIG. 7.

Figure 3:
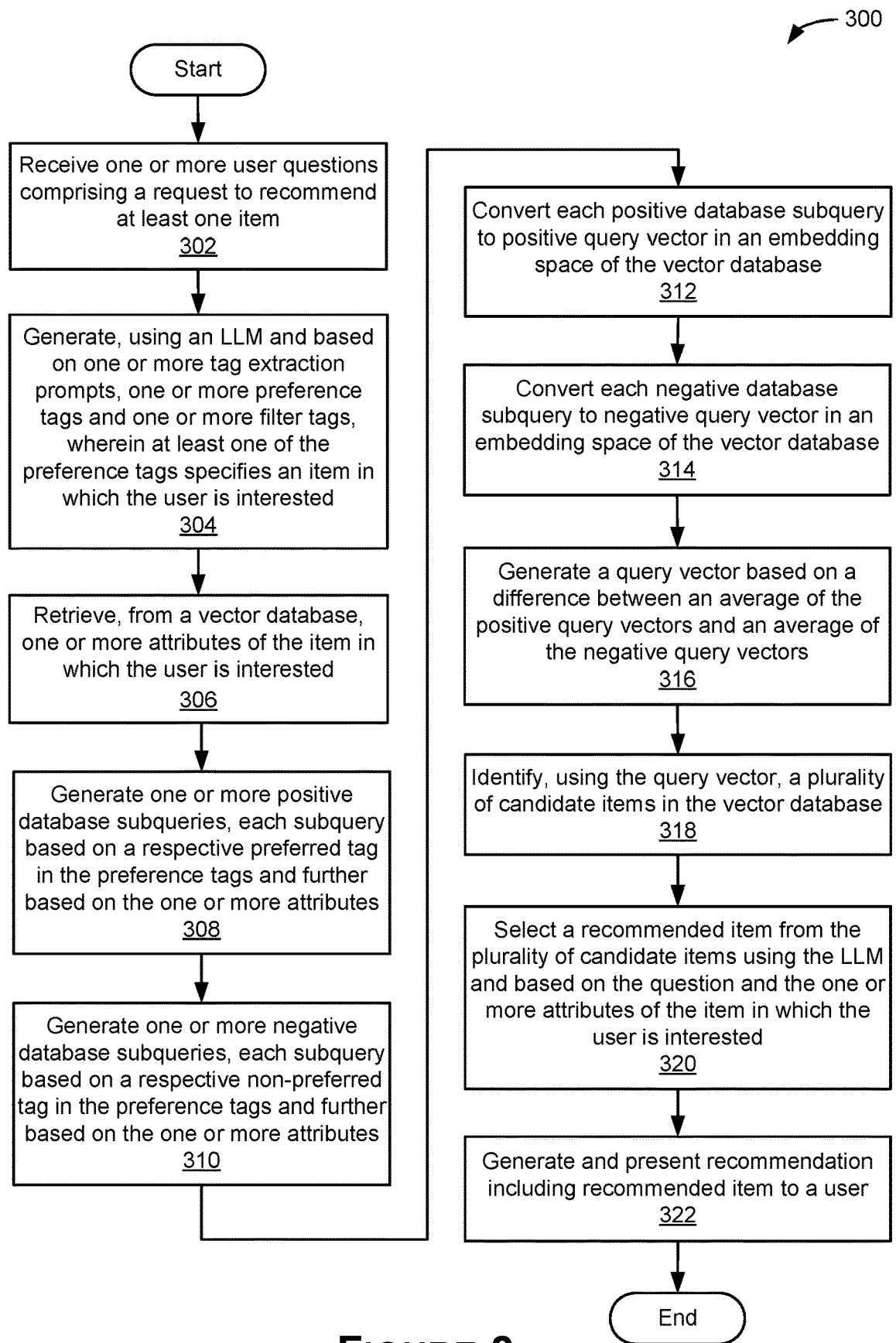
FIG. 3 illustrates a flow diagram of a method for generating item recommendations using a language model augmented with item information retrieved from a database, according to various embodiments.

FIG. 3 illustrates a flow diagram of a method 300 for generating item recommendations using a language model augmented with item information retrieved from a database, according to various embodiments. Each block of method 300, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 300 is described, by way of example, with respect to the system of FIGS. 1-2. However, this method may additionally or alternatively be executed by any one system, or any combination of systems, including, but not limited to, those described herein. Further, the operations in method 300 can be omitted, repeated, and/or performed in any order without departing from the scope of the present disclosure.

As shown in FIG. 3, method 300 begins with operation 302, in which a recommendation engine 122 receives one or more user questions comprising a request to recommend at least one item. An example question is "Recommend a movie which has an inspiring story like Electra Chronicles and has the cinematic style of a Sun Studios movie like Time Shift. I don't like romance movies." In operation 304, the recommendation engine 122 generates, using an LLM and based on one or more tag extraction prompt 228, one or more query tags 232. The query tags 232 include one or more preference tags 234 and/or one or more filter tags 240. The preference tags 234 include one or more preferred tags 236 specifying information related to items the user prefers and/or one or more non-preferred tags 238 specifying information related to items the user does not prefer. At least one of the preferred tags 236 specifies an item in which the user is interested. In operation 306, the recommendation engine 122 retrieves, from a vector database 126, one or more item attributes 246 of the item in which the user is interested.

In operation 308, the recommendation engine 122 generates one or more positive database subqueries. Each positive subquery is generated based on a respective preferred tag 236 in the preference tags 234 and further based on the one or more item attributes 246, such as genres of items in which the user is interested. The item attributes 246 are retrieved from the vector database 126 for each item in which the user is interested. The positive database subqueries can include the genres that are of interest to the user (e.g., preferred genres) and the attributes 246 of the item (e.g., movie) the movie that is of interest to the user, for example. The recommendation engine 122 can identify the item attributes 246 by querying the vector database 126. For example, if the item the user prefers is "Electra Chronicles," then the item query 244 can specify "Electra Chronicles" and the item attributes 246 can be "genre tags='Action|Adventure|adapted from:comic|superhero'." Accordingly, the positive database subqueries can include "Electra Chronicles," "Time Shift," "Sun Studios," "Action," "Adventure," "adapted from: comic," and "superhero."

In operation 310, the recommendation engine 122 generates one or more negative database subqueries. Each negative database subquery is generated based on a respective non-preferred tag 238 in the preference tags 234. The negative database subqueries can include the genres the user does not prefer. For example, the negative database subqueries can include "genre=romance" if the user question 224 states that the user does not like romance movies.

In operation 312, the recommendation engine 122 converts each positive database subquery to a respective positive query vector in an embedding space of the vector database 126. In operation 314, the recommendation engine 122 converts each negative database subquery to a respective negative query vector in an embedding space of the vector database. In operation 316, the recommendation engine 122 generates a combined query vector 252 based on a difference between an average of the positive query vectors and an average of the negative query vectors. In operation 318, the recommendation engine 122 identifies, using the combined query vector 252 and the filter tags 240, a plurality of candidate items 254 in the vector database 126. For example, the recommendation engine 122 can query the vector database 126 using a query that includes the query vector 252 and the filter tags 240. The vector database 126 returns a set of candidate items 254 as a query result. In operation 320, the recommendation engine 122 selects a recommended item from the set of candidate items 254 using the LLM 124 and based on the question 224 and the one or more attributes of each item in the set of candidate items 254. For example, the recommendation engine 122 provides the item attributes 246 of each item in the candidate items 254 and the user question 224 to the language model 124.

In operation 322, the recommendation engine 122 generates and a recommendation 260 based on the item attributes 246 of each item in the candidate items 254 and the user question 224. The recommendation 260 includes a recommended item. The recommendation engine 122 presents the recommended item to a user. For example, in operation 322, the recommendation engine 122 submits a recommendation prompt 258 generated by the recommendation prompt generator 256 to the language model 124. The language model 124 generates the recommendation 260. An example recommendation 260 generated by the language model 124 in response to the recommendation prompt 258 is "I recommend 'The Building Electra Movie' as it has an inspiring story like Electra Chronicles and combines the cinematic style of animation, making it visually appealing. The movie features a blend of action, comedy, and superhero themes, similar to the Electra Chronicles and Time Shift movies. Directed by Chris McKay, it has a rating of 3.6 and was released in 2017." The example recommendation 260 includes an explanation of why the recommended movie is being recommended, e.g., a description of the aspects of the recommended movie ("The Building Electra Movie") that are similar to aspects of the movies indicated as being preferred in the question 224 (e.g., "Electra Chronicles" and "Time Shift"). The recommendation engine 122 presents the recommendation 260 to the user in an appropriate user interface, such as a text display, a textual message, a message in a chat-based user interface, or the like.

FIG. 4A illustrates an example tag extraction prompt 228 and example query tags 232, according to various embodiments. The tag extraction prompt 228 is in a format appropriate for input to an LLM and includes three sections: prompt instructions 402, a prompt user message 404, and a prompt answer format 406. The prompt instructions 402 instruct the LLM to extract information from the following prompt user message 404. Further, if there is not enough information to fill slots, the LLM is to fill with 'Nil'. The LLM is to use default values of ratings: 3.0 and 5.0 and default values of year: 2000 and 2020. The LLM is to strictly follow the prompt answer format 406.

The prompt user message 404 is based on the user question 224 and contains the following text in this example: "My children like Monster Express and movies made by Studio Sakura. Can you recommend a movie for them to watch that is appropriate for a 4 year old and made since 2020? I want movies rated 4 or above. I like movies with Ryan Smith but I don't like action movies." The prompt answer format 406 specifies how the LLM is to extract the extracted tags 230 from the prompt user message 404. The prompt user message 404 in this example is {"Preferred Genre": ["<Fill>"], "Preferred Movies": ["<Fill>"], "Un Preferred Genre": ["<Fill>"], "Un Preferred Movies": ["<Fill>"]", Rating: ["<Fill>", "<Fill>"], "Year": ["<Fill>", "<Fill>"], "Actor/Director\": ["<Fill>"]}. The LLM generates the extracted tags 230 in response to the tag extraction prompt 228.

The extracted tags 230 generated by the LLM include preferred tags 236, non-preferred tags 238, and filter tags 240. The preferred tags 236 include a preferred genre 410 ("Animation, Family") and preferred movies 412 ("Monster Express, Studio Sakura"). The non-preferred tags 238 include an un-preferred genre 414 ("Action") and un-preferred movies 416 (nil, since the prompt user message 404 does not specify any non-preferred movies). The filter tags 240 include a rating 418 (4.0 out of 5.0), a year 420 (2020 to 2023), and an actor/director 422 ("Ryan Smith"). The subquery generator 242 generates positive subqueries "Animation," "Family," "Monster Express," and "Studio Sakura" based on the preferred tags 236 and generates negative subqueries "Action" based on the non-preferred tags 238. The query vector generator 250 generates a combined query vector 252 based on the positive subqueries and the negative subqueries.

FIG. 4B illustrates an example recommendation prompt 258, according to various embodiments. The recommendation prompt 258 is in a format appropriate for input to an LLM and includes two sections: item attributes 450 and question 452. The item attributes 450 include item attributes for four items, which are movie items in the example of FIG. 4B. Each item attribute has a name and a value. For each movie item, the item attributes 450 include an attribute named "movie name" having a value that specifies the name of the movie item. There are four movie items in the example of FIG. 4B, having the names "The Building Movie," "Defender," "The Building Electra Movie," and "Electra vs. Dynamo." The attributes for each movie item also include a "genre tags" attribute having values that specify the names of genres associated with the movie item, such as "action," "adventure," "animation," and so on. The attributes for each movie item further include an "actors" attribute specifying actors who appear in the move, a "directors" attribute specifying directors of the movie, a ratings attribute specifying a rating of the movie, and a "year released" attribute specifying a year in which the movie was released.

For example, the first movie item, which has the movie name "The Building Movie," has the following attributes: a "genre tag" attribute with value "Action|Adventure|Animation|Children|Comedy|Fantasy|animation|childhood|computer animation|creativity|fast paced|imagination|original|oscar (best animated feature)|stop motion|toys," an "actors" attribute with value "Chris Gant|Bill Arnett|Will Antonio," a "directors" attribute with the value "Christopher Miller|Phil Lord," a "ratings" attribute with the value "3.7," and a "year released" attribute with the value "2014."

The recommendation prompt 258 also includes a question 452, which can include one or more of the user question 224 that request item recommendations. The example question 452 is "Recommend a movie which has an inspiring story like Electra Chronicles and has the cinematic style of a Sun Studios movie like Time Shift." In response to receiving the user question 224, the recommendation engine 122 generates the recommendation prompt 258 and provides the recommendation prompt 258 as input to the language model 124. The language model 124 generates a recommendation 260. For example, a recommendation 260 generated in response to the question 452 is "I recommend 'The Building Electra Movie' as it has an inspiring story like Electra Chronicles and combines the cinematic style of animation, making it visually appealing. The movie features a blend of action, comedy, and superhero themes, similar to the Electra Chronicles and Time Shift movies. Directed by Chris McKay, it has a rating of 3.6 and was released in 2017."

In sum, the disclosed retrieval-augmented recommendation system uses an LLM to decompose a question requesting recommendations for items into points of interest referred to as "query tags." The query tags can include preference tags, which are names of particular preferred or non-preferred items or item genres named in the question. For example, a preferred item can be a movie name specified in the question, and a non-preferred item genre can be a movie genre specified as not being liked by the user in the question. The query tags can also include filter tags, which specify particular desired attributes of items, e.g., year of production, actors and directors for movies, and so on. The decomposition is performed by providing appropriate prompts to the LLM, e.g., a prompt for each type of query tag. Previous questions received from a user can be used by the LLM as context to answer the question if the user indicates that the previous questions are relevant. To augment the question with further details of each item named in the question, the recommendation system queries a vector database of item information to retrieve attributes of each item named in the question.

The recommendation system generates a set of positive database "subqueries" based on the preferred item genres and/or the name and attributes of each particular preferred item (e.g., movie) named in the user query. The term "subquery" herein refers to a data value that can include one or more tags and/or one or more attributes. One or more subqueries can be used to generate a vector database query as described herein. The system also generates a set of negative database queries based on the non-preferred item genres. Attributes can also be determined for each particular non-preferred item named in the user query, if any, and included in the negative database queries. The positive and negative database subqueries are converted to respective positive and negative vectors in an embedding space that is used by the vector database. A combined query vector is determined based on a difference between an average of the positive query vectors and an average of the negative query vectors. For example, the combined query vector can be calculated as average positive vector+(average positive vector−average negative vector).

The system queries the vector database using the combined query vector and the filter tags to identify relevant items in the vector database. The system then provides the identified relevant items (including the name and attributes of each relevant item), the question, and the attributes to the LLM as input, and instructs the LLM to answer based on the provided input without using other knowledge the LLM has about the items being recommended. The LLM generates an answer that identifies one or more recommended items based on the provided input.

One technical advantage of the disclosed techniques relative to the prior approaches is the ability to generate accurate results without including incorrect results. If the LLM uses its default knowledge base to generate the recommendations, then some of the recommendations could be incorrect, since the generative model used by the LLM does not distinguish between correct and incorrect output. Since the LLM is operationally restricted to using correct item information as its knowledge base for answering questions, the recommendations do not include recommendations based on incorrect item information that could be present in the more general knowledge base the LLM would ordinarily use.

Another technical advantage of the disclosed techniques is that the item information used to generate recommendations can be updated independently of the LLM. New item information can be added to the item information without re-training the LLM. Since re-training the LLM can take a substantial amount of time and computing resources, item information learned by the LLM becomes out-of-date and incomplete as new items become available. In contrast, the database of item information used by the disclosed techniques can be updated to include new or changed item information in a short amount of time. The disclosed techniques are thus able to generate recommendations using an LLM based on more recent item information than would otherwise be available to the LLM. These technical advantages represent one or more technological improvements over prior approaches.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing, and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems implementing one or more language models-such as one or more large language models (LLMs) that may process text, audio, and/or image data, systems for performing light transport simulation, systems for performing collaborative content creation for 3D assets, systems implemented at least partially using cloud computing resources, and/or other types of systems.

Example Computing Device

Figure 5:
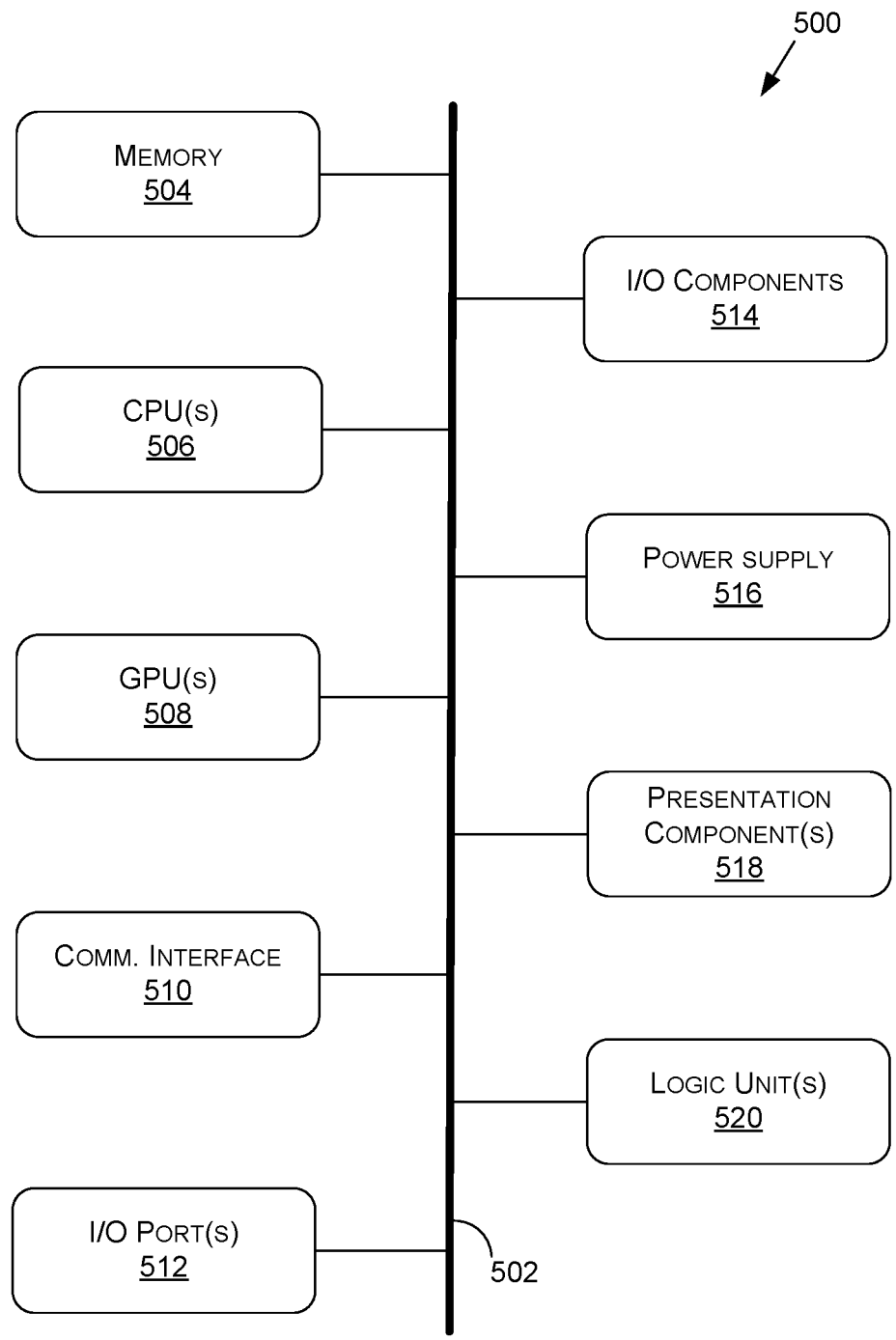
FIG. 5 is a block diagram of an example computing device suitable for use in implementing some embodiments of the present disclosure.

FIG. 5 is a block diagram of an example computing device(s) 500 suitable for use in implementing some embodiments of the present disclosure. Computing device 500 may include an interconnect system 502 that directly or indirectly couples the following devices: memory 504, one or more central processing units (CPUs) 506, one or more graphics processing units (GPUs) 508, a communication interface 510, input/output (I/O) ports 512, input/output components 514, a power supply 516, one or more presentation components 518 (e.g., display(s)), and one or more logic units 520. In at least one embodiment, the computing device(s) 500 may comprise one or more virtual machines (VMs), and/or any of the components thereof may comprise virtual components (e.g., virtual hardware components). For non-limiting examples, one or more of the GPUs 508 may comprise one or more vGPUs, one or more of the CPUs 506 may comprise one or more vCPUs, and/or one or more of the logic units 520 may comprise one or more virtual logic units. As such, a computing device(s) 500 may include discrete components (e.g., a full GPU dedicated to the computing device 500), virtual components (e.g., a portion of a GPU dedicated to the computing device 500), or a combination thereof.

Although the various blocks of FIG. 5 are shown as connected via the interconnect system 502 with lines, this is not intended to be limiting and is for clarity only. For example, in some embodiments, a presentation component

518, such as a display device, may be considered an I/O component 514 (e.g., if the display is a touch screen). As another example, the CPUs 506 and/or GPUs 508 may include memory (e.g., the memory 504 may be representative of a storage device in addition to the memory of the GPUs 508, the CPUs 506, and/or other components). In other words, the computing device of FIG. 5 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5.

The interconnect system 502 may represent one or more links or busses, such as an address bus, a data bus, a control bus, or a combination thereof. The interconnect system 502 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 506 may be directly connected to the memory 504. Further, the CPU 506 may be directly connected to the GPU 508. Where there is direct, or point-to-point connection between components, the interconnect system 502 may include a PCIe link to carry out the connection. In these examples, a PCI bus need not be included in the computing device 500.

The memory 504 may include any of a variety of computer-readable media. The computer-readable media may be any available media that may be accessed by the computing device 500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 500. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 506 may be configured to execute at least some of the computer-readable instructions to control one or more components of the computing device 500 to perform one or more of the methods and/or processes described herein. The CPU(s) 506 may each include one or more cores (e.g., one, two, four, eight, twenty-eight, seventy-two, etc.) that are capable of handling a multitude of software threads simultaneously. The CPU(s) 506 may include any type of processor, and may include different types of processors depending on the type of computing device 500 implemented (e.g., processors with fewer cores for mobile devices and processors with more cores for servers). For example, depending on the type of computing device 500, the processor may be an Advanced RISC Machines (ARM) processor implemented using Reduced Instruction Set Computing (RISC) or an x86 processor implemented using Complex Instruction Set Computing (CISC). The computing device 500 may include one or more CPUs 506 in addition to one or more microprocessors or supplementary co-processors, such as math co-processors.

In addition to or alternatively from the CPU(s) 506, the GPU(s) 508 may be configured to execute at least some of the computer-readable instructions to control one or more components of the computing device 500 to perform one or more of the methods and/or processes described herein. One or more of the GPU(s) 508 may be an integrated GPU (e.g., with one or more of the CPU(s) 506 and/or one or more of the GPU(s) 508 may be a discrete GPU. In embodiments, one or more of the GPU(s) 508 may be a coprocessor of one or more of the CPU(s) 506. The GPU(s) 508 may be used by the computing device 500 to render graphics (e.g., 3D graphics) or perform general purpose computations. For example, the GPU(s) 508 may be used for General-Purpose computing on GPUs (GPGPU). The GPU(s) 508 may include hundreds or thousands of cores that are capable of handling hundreds or thousands of software threads simultaneously. The GPU(s) 508 may generate pixel data for output images in response to rendering commands (e.g., rendering commands from the CPU(s) 506 received via a host interface). The GPU(s) 508 may include graphics memory, such as display memory, for storing pixel data or any other suitable data, such as GPGPU data. The display memory may be included as part of the memory 504. The GPU(s) 508 may include two or more GPUs operating in parallel (e.g., via a link). The link may directly connect the GPUs (e.g., using NVLINK) or may connect the GPUs through a switch (e.g., using NVSwitch). When combined together, each GPU 508 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 506 and/or the GPU(s) 508, the logic unit(s) 520 may be configured to execute at least some of the computer-readable instructions to control one or more components of the computing device 500 to perform one or more of the methods and/or processes described herein. In embodiments, the CPU(s) 506, the GPU(s) 508, and/or the logic unit(s) 520 may discretely or jointly perform any combination of the methods, processes and/or portions thereof. One or more of the logic units 520 may be part of and/or integrated in one or more of the CPU(s) 506 and/or the GPU(s) 508 and/or one or more of the logic units 520 may be discrete components or otherwise external to the CPU(s) 506 and/or the GPU(s) 508. In embodiments, one or more of the logic units 520 may be a coprocessor of one or more of the CPU(s) 506 and/or one or more of the GPU(s) 508.

Examples of the logic unit(s) 520 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

In various embodiments, one or more CPU(s) 506, GPU(s) 508, and/or logic unit(s) 520 are configured to execute one or more instances of recommendation engine 122 and/or language model 124. Recommendations 260 can then be generated based on user question 224 and provided to user, e.g., via text interface 220 of language model 124.

The communication interface 510 may include one or more receivers, transmitters, and/or transceivers that enable the computing device 500 to communicate with other computing devices via an electronic communication network, included wired and/or wireless communications. The communication interface 510 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 520 and/or communication interface 510 may include one or more data processing units (DPUs) to transmit data received over a network and/or through interconnect system 502 directly to (e.g., a memory of) one or more GPU(s) 508.

The I/O ports 512 may enable the computing device 500 to be logically coupled to other devices including the I/O components 514, the presentation component(s) 518, and/or other components, some of which may be built in to (e.g., integrated in) the computing device 500. Illustrative I/O components 514 include a microphone, mouse, keyboard, joystick, game pad, game controller, satellite dish, scanner, printer, wireless device, etc. The I/O components 514 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 500. The computing device 500 may include depth cameras, such as stereoscopic camera systems, infrared camera systems, RGB camera systems, touchscreen technology, and combinations of these, for gesture detection and recognition. Additionally, the computing device 500 may include accelerometers or gyroscopes (e.g., as part of an inertia measurement unit (IMU)) that enable detection of motion. In some examples, the output of the accelerometers or gyroscopes may be used by the computing device 500 to render immersive augmented reality or virtual reality.

The power supply 516 may include a hard-wired power supply, a battery power supply, or a combination thereof. The power supply 516 may provide power to the computing device 500 to enable the components of the computing device 500 to operate.

The presentation component(s) 518 may include a display (e.g., a monitor, a touch screen, a television screen, a heads-up-display (HUD), other display types, or a combination thereof), speakers, and/or other presentation components. The presentation component(s) 518 may receive data from other components (e.g., the GPU(s) 508, the CPU(s) 506, DPUs, etc.), and output the data (e.g., as an image, video, sound, etc.).

Example Data Center

Figure 6:
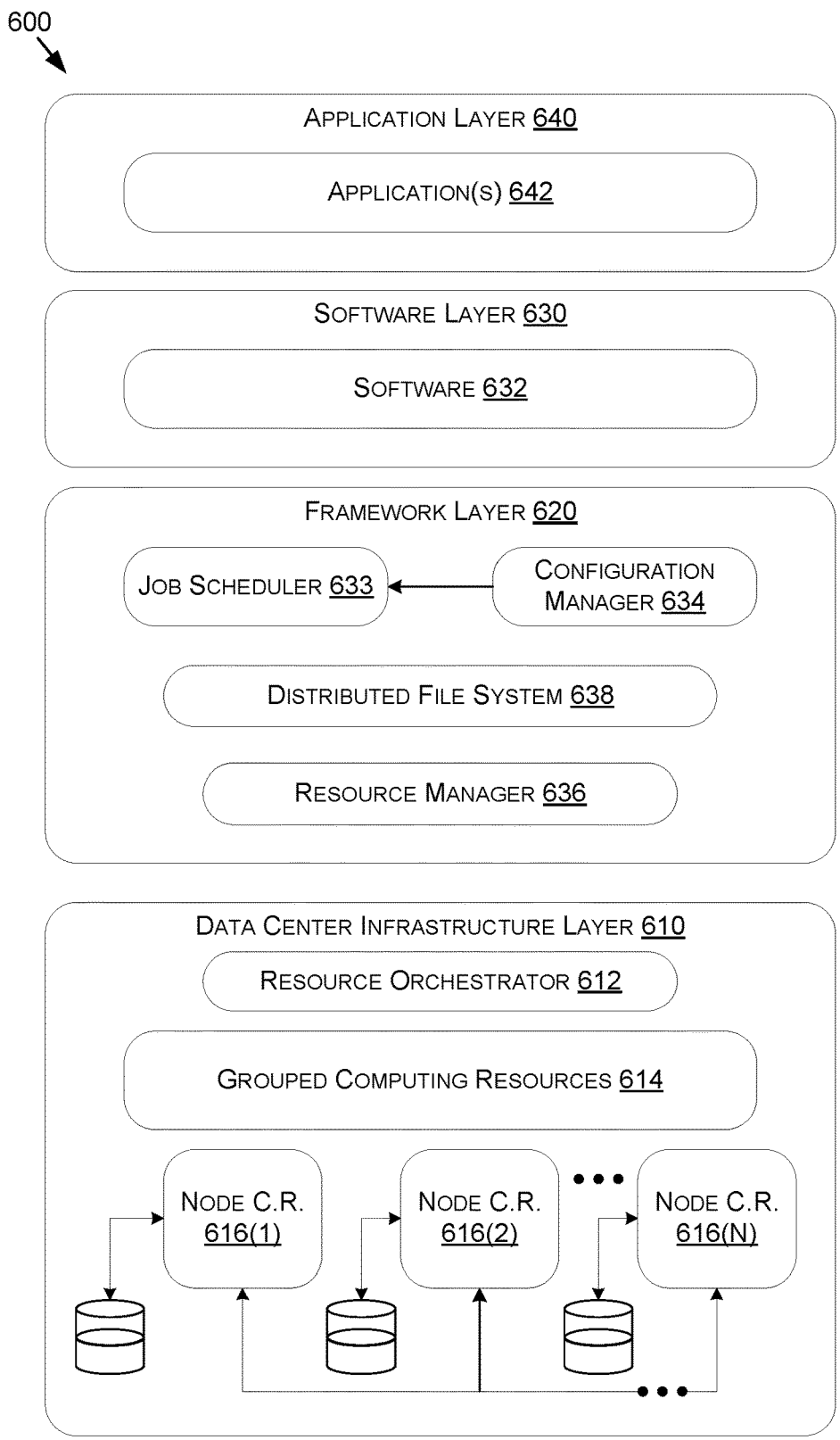
FIG. 6 is a block diagram of an example data center suitable for use in implementing some embodiments of the present disclosure.

FIG. 6 illustrates an example data center 600 that may be used in at least one embodiments of the present disclosure. The data center 600 may include a data center infrastructure layer 610, a framework layer 620, a software layer 630, and/or an application layer 640.

As shown in FIG. 6, the data center infrastructure layer 610 may include a resource orchestrator 612, grouped computing resources 614, and node computing resources ("node C.R.s") 616(1)-716(N), where "N" represents any whole, positive integer. In at least one embodiment, node C.R.s 616(1)-716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 616(1)-716(N) may correspond to a server having one or more of the above-mentioned computing resources. In addition, in some embodiments, the node C.R.s 616(1)-716(N) may include one or more virtual components, such as vGPUs, vCPUs, and/or the like, and/or one or more of the node C.R.s 616(1)-716(N) may correspond to a virtual machine (VM).

In at least one embodiment, grouped computing resources 614 may include separate groupings of node C.R.s 616 housed within one or more racks (not shown), or many racks housed in data centers at various geographical locations (also not shown). Separate groupings of node C.R.s 616 within grouped computing resources 614 may include grouped compute, network, memory or storage resources that may be configured or allocated to support one or more workloads. In at least one embodiment, several node C.R.s 616 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 612 may configure or otherwise control one or more node C.R.s 616(1)-716(N) and/or grouped computing resources 614. In at least one embodiment, resource orchestrator 612 may include a software design infrastructure (SDI) management entity for the data center 600. The resource orchestrator 612 may include hardware, software, or some combination thereof.

In at least one embodiment, as shown in FIG. 6, framework layer 620 may include a job scheduler 633, a configuration manager 634, a resource manager 636, and/or a distributed file system 638. The framework layer 620 may include a framework to support software 632 of software layer 630 and/or one or more application(s) 642 of application layer 640. The software 632 or application(s) 642 may respectively include web-based service software or applications, such as those provided by Amazon Web Services, Google Cloud and Microsoft Azure. The framework layer 620 may be, but is not limited to, a type of free and open-source software web application framework such as Apache Spark™ (hereinafter "Spark") that may utilize distributed file system 638 for large-scale data processing (e.g., "big data"). In at least one embodiment, job scheduler 633 may include a Spark driver to facilitate scheduling of workloads supported by various layers of data center 600. The configuration manager 634 may be capable of configuring different layers such as software layer 630 and framework layer 620 including Spark and distributed file system 638 for supporting large-scale data processing. The resource manager 636 may be capable of managing clustered or grouped computing resources mapped to or allocated for support of distributed file system 638 and job scheduler 633. In at least one embodiment, clustered or grouped computing resources may include grouped computing resource 614 at data center infrastructure layer 610. The resource manager 636 may coordinate with resource orchestrator 612 to manage these mapped or allocated computing resources.

In at least one embodiment, software 632 included in software layer 630 may include software used by at least portions of node C.R.s 616(1)-716(N), grouped computing resources 614, and/or distributed file system 638 of framework layer 620. One or more types of software may include, but are not limited to, Internet web page search software, e-mail virus scan software, database software, and streaming video content software.

In at least one embodiment, application(s) 642 included in application layer 640 may include one or more types of applications used by at least portions of node C.R.s 616(1)-716(N), grouped computing resources 614, and/or distributed file system 638 of framework layer 620. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 634, resource manager 636, and resource orchestrator 612 may implement any number and type of self-modifying actions based on any amount and type of data acquired in any technically feasible fashion. Self-modifying actions may relieve a data center operator of data center 600 from making possibly bad configuration decisions and possibly avoiding underutilized and/or poor performing portions of a data center.

The data center 600 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 600. In at least one embodiment, trained or deployed machine learning models corresponding to one or more neural networks may be used to infer or predict information using resources described above with respect to the data center 600 by using weight parameters calculated through one or more training techniques, such as but not limited to those described herein.

In at least one embodiment, the data center 600 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 500 of FIG. 5—e.g., each device may include similar components, features, and/or functionality of the computing device(s) 500. In addition, where backend devices (e.g., servers, NAS, etc.) are implemented, the backend devices may be included as part of a data center 600, an example of which is described in more detail herein with respect to FIG. 6.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 500 described herein with respect to FIG. 5. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

1. In some embodiments, a computer-implemented method comprises receiving, at a computing device, a request to recommend an item; generating, based at least on the request, one or more query tags, the one or more query tags including one or more preferred tags, at least one of the preferred tags specifying an item of interest; generating one or more subqueries based at least on the one or more query tags, at least one of the subqueries being generated further based at least on one or more attributes of the item of interest, the one or more attributes being retrieved from a vector database; generating, based at least on the one or more subqueries, a query vector in an embedding space of the vector database; identifying, in the vector database, a plurality of candidate items by querying the vector database using the query vector; and selecting a recommended item from the plurality of candidate items based at least on the request and further based at least on the one or more attributes of the item.

2. The method of clause 1, wherein the one or more subqueries include one or more positive subqueries, and wherein each positive subquery is based at least on a respective preferred tag of the one or more preferred tags.

3. The method of clause 2, wherein at least one of the positive subqueries is based at least on the retrieved one or more attributes of the item.

4. The method of clause 1, wherein the one or more query tags include one or more non-preferred tags, wherein each non-preferred tag specifies an item not of interest or an item genre not of interest.

5. The method of clause 4, wherein the one or more database queries include one or more negative subqueries, wherein each negative subquery is based at least on a respective non-preferred tag of the one or more non-preferred tags.

6. The method of clause 1, wherein the one or more query tags include one or more filter tags, wherein each filter tag specifies an item attribute and indicates that items having the specified attribute are of interest.

7. The method of clause 1, wherein the vector database includes a plurality of stored items and one or more attributes of each stored item.

8. The method of clause 1, wherein the plurality of candidate items are identified by querying the vector database using the query vector.

9. The method of clause 8, wherein the plurality of candidate items are further identified in the vector database by querying the vector database using the query vector and one or more filter tags, wherein each filter tag specifies an item attribute and indicates that items having the specified attribute are of interest.

10. The method of clause 1, wherein the query tags are generated using a large language model (LLM) based at least on one or more query tag generation prompts.

11. The method of clause 1, wherein the recommended item is selected from the plurality of candidate items using an LLM based at least on one or more recommendation prompts, wherein the LLM selects the recommended item by identifying at least one of the candidate items having a preferred tag that matches an item or item genre named in the request to recommend an item.

12. The method of clause 1, wherein the one or more subqueries include a plurality of positive subqueries and a plurality of negative subqueries, wherein generating, based at least on the one or more subqueries, the query vector in the embedding space of the vector database comprises: converting each positive subquery in the plurality of positive subqueries to a respective positive query vector of a plurality of positive query vectors; converting each negative subquery in the plurality of negative subqueries to a respective negative query vector of a plurality of negative query vectors; and generating an average positive vector based on the plurality of positive query vectors and an average negative vector based on the plurality of negative query vectors, wherein the vector in the embedding space of the vector database is generated based on a difference between the average positive vector and the average negative vector.

13. In some embodiments, a processor comprises one or more processing units to perform operations comprising: receiving a request to recommend an item; generating, based at least on the request, one or more query tags, the one or more query tags including one or more preferred tags specifying an item of interest; generating one or more subqueries based at least on the one or more query tags, at least one of the subqueries being generated further based at least on one or more attributes of the item retrieved from a vector database; generating, based at least on the one or more subqueries, a query vector in an embedding space of the vector database; identifying, in the vector database, a plurality of candidate items by querying the vector database using the query vector; and selecting a recommended item from the plurality of candidate items based at least on the request and further based at least on the one or more attributes of the item.

14. The processor of clause 13, wherein the one or more subqueries include one or more positive subqueries, and wherein each positive subquery is based at least on a respective preferred tag of the one or more preferred tags.

15. The processor of clause 14, wherein at least one of the positive subqueries is based at least on the retrieved one or more attributes of the item.

16. The processor of clause 13, wherein the processor is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system for generating or presenting at least one of virtual reality content, augmented reality content, or mixed reality content; a system implemented using a robot; a system for performing one or more conversational AI operations; a system implementing one or more large language models (LLMs); a system for generating synthetic data; a system for performing one or more generative AI operations; a system incorporating one or more virtual machines (VMs); a system implemented at least partially in a data center; or a system implemented at least partially using cloud computing resources.

17. In some embodiments, a system comprises one or more processing units to perform operations comprising: receiving a request to recommend an item; generating, based at least on the request and using a language model, one or more query tags, at least one of the query tags specifying an item of interest; generating, based at least on the one or more query tags and one or more attributes of the item of interest, a query vector in an embedding space of the vector database; identifying, in the vector database, a plurality of candidate items by querying the vector database using the query vector; providing the plurality of candidate items to the language model; and selecting, using the language model, a recommended item from the plurality of candidate items based at least on the request and further based at least on the one or more attributes of the item.

18. The system of clause 17, wherein generating the query vector in the embedding space of the vector database comprises: generating one or more subqueries based at least on the one or more query tags, at least one of the subqueries being generated further based at least on one or more attributes of the item of interest, the one or more attributes being retrieved from a vector database, wherein the one or more subqueries include one or more positive subqueries, and wherein each positive subquery is based at least on a respective preferred tag of the one or more preferred tags, and wherein the query vector is generated based on the one or more subqueries.

19. The system of clause 18, wherein at least one of the positive subqueries is based at least on the retrieved one or more attributes of the item.

20. The system of clause 17, wherein the system is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system for generating or presenting at least one of virtual reality content, augmented reality content, or mixed reality content; a system implemented using a robot; a system for performing one or more conversational AI operations; a system implementing one or more large language models (LLMs); a system for generating synthetic data; a system for performing one or more generative AI operations; a system incorporating one or more virtual machines (VMs); a system implemented at least partially in a data center; or a system implemented at least partially using cloud computing resources.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method, comprising:
    receiving, at a computing device, a request to recommend an item;
    generating, based at least on the request, one or more query tags, the one or more query tags including one or more preferred tags, at least one of the preferred tags specifying an item of interest;
    generating one or more subqueries based at least on the one or more query tags, at least one of the subqueries being generated further based at least on one or more attributes of the item of interest, the one or more attributes being retrieved from a vector database;
    generating, based at least on the one or more subqueries, a query vector in an embedding space of the vector database;
    identifying, in the vector database, a plurality of candidate items by querying the vector database using the query vector; and
    selecting a recommended item from the plurality of candidate items based at least on the request and further based at least on the one or more attributes of the item.

2. The method of claim 1, wherein the one or more subqueries include one or more positive subqueries, and wherein each positive subquery is based at least on a respective preferred tag of the one or more preferred tags.

3. The method of claim 2, wherein at least one of the positive subqueries is based at least on the retrieved one or more attributes of the item.

4. The method of claim 1, wherein the one or more query tags include one or more non-preferred tags, wherein each non-preferred tag specifies an item not of interest or an item genre not of interest.

5. The method of claim 4, wherein the one or more database queries include one or more negative subqueries, wherein each negative subquery is based at least on a respective non-preferred tag of the one or more non-preferred tags.

6. The method of claim 1, wherein the one or more query tags include one or more filter tags, wherein each filter tag specifies an item attribute and indicates that items having the specified attribute are of interest.

7. The method of claim 1, wherein the vector database includes a plurality of stored items and one or more attributes of each stored item.

8. The method of claim 1, wherein the plurality of candidate items are identified by querying the vector database using the query vector.

9. The method of claim 8, wherein the plurality of candidate items are further identified in the vector database by querying the vector database using the query vector and one or more filter tags, wherein each filter tag specifies an item attribute and indicates that items having the specified attribute are of interest.

10. The method of claim 1, wherein the query tags are generated using a large language model (LLM) based at least on one or more query tag generation prompts.

11. The method of claim 1, wherein the recommended item is selected from the plurality of candidate items using an LLM based at least on one or more recommendation prompts, wherein the LLM selects the recommended item by identifying at least one of the candidate items having a preferred tag that matches an item or item genre named in the request to recommend an item.

12. The method of claim 1, wherein the one or more subqueries include a plurality of positive subqueries and a plurality of negative subqueries, wherein generating, based at least on the one or more subqueries, the query vector in the embedding space of the vector database comprises:
converting each positive subquery in the plurality of positive subqueries to a respective positive query vector of a plurality of positive query vectors;
converting each negative subquery in the plurality of negative subqueries to a respective negative query vector of a plurality of negative query vectors; and
generating an average positive vector based on the plurality of positive query vectors and an average negative vector based on the plurality of negative query vectors, wherein the vector in the embedding space of the vector database is generated based on a difference between the average positive vector and the average negative vector.

13. A processor comprising:
one or more processing units to perform operations comprising:
receiving a request to recommend an item;
generating, based at least on the request, one or more query tags, the one or more query tags including one or more preferred tags specifying an item of interest;
generating one or more subqueries based at least on the one or more query tags, at least one of the subqueries being generated further based at least on one or more attributes of the item retrieved from a vector database;
generating, based at least on the one or more subqueries, a query vector in an embedding space of the vector database;
identifying, in the vector database, a plurality of candidate items by querying the vector database using the query vector; and
selecting a recommended item from the plurality of candidate items based at least on the request and further based at least on the one or more attributes of the item.

14. The processor of claim 13, wherein the one or more subqueries include one or more positive subqueries, and wherein each positive subquery is based at least on a respective preferred tag of the one or more preferred tags.

15. The processor of claim 14, wherein at least one of the positive subqueries is based at least on the retrieved one or more attributes of the item.

16. The processor of claim 13, wherein the processor is comprised in at least one of:
a control system for an autonomous or semi-autonomous machine;
a perception system for an autonomous or semi-autonomous machine;
a system for performing one or more simulation operations;
a system for performing one or more digital twin operations;
a system for performing light transport simulation;
a system for performing collaborative content creation for 3D assets;
a system for performing one or more deep learning operations;
a system implemented using an edge device;
a system for generating or presenting at least one of virtual reality content, augmented reality content, or mixed reality content;
a system implemented using a robot;
a system for performing one or more conversational AI operations;
a system implementing one or more large language models (LLMs);
a system for generating synthetic data;
a system for performing one or more generative AI operations;
a system incorporating one or more virtual machines (VMs);
a system implemented at least partially in a data center; or
a system implemented at least partially using cloud computing resources.

17. A system comprising:
one or more processing units to perform operations comprising:
receiving a request to recommend an item;
generating, based at least on the request and using a language model, one or more query tags, at least one of the query tags specifying an item of interest;
generating, based at least on the one or more query tags and one or more attributes of the item of interest, a query vector in an embedding space of the vector database;

identifying, in the vector database, a plurality of candidate items by querying the vector database using the query vector;

providing the plurality of candidate items to the language model; and selecting, using the language model, a recommended item from the plurality of candidate items based at least on the request and further based at least on the one or more attributes of the item.

18. The system of claim 17, wherein generating the query vector in the embedding space of the vector database comprises:

generating one or more subqueries based at least on the one or more query tags, at least one of the subqueries being generated further based at least on one or more attributes of the item of interest, the one or more attributes being retrieved from a vector database, wherein the one or more subqueries include one or more positive subqueries, and wherein each positive subquery is based at least on a respective preferred tag of the one or more preferred tags, and wherein the query vector is generated based on the one or more subqueries.

19. The system of claim 18, wherein at least one of the positive subqueries is based at least on the retrieved one or more attributes of the item.

20. The system of claim 17, wherein the system is comprised in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

a system implemented using an edge device;

a system for generating or presenting at least one of virtual reality content, augmented reality content, or mixed reality content;

a system implemented using a robot;

a system for performing one or more conversational AI operations;

a system implementing one or more large language models (LLMs);

a system for generating synthetic data;

a system for performing one or more generative AI operations;

a system incorporating one or more virtual machines (VMs);

a system implemented at least partially in a data center; or a system implemented at least partially using cloud computing resources.

* * * * *